(12) United States Patent
Hsu et al.

(10) Patent No.: US 10,480,225 B1
(45) Date of Patent: Nov. 19, 2019

(54) HINGE MECHANISM AND FLEXIBLE ELECTRONIC DEVICE HAVING THE SAME

(71) Applicant: FOSITEK CORPORATION, New Taipei (TW)

(72) Inventors: An-Szu Hsu, New Taipei (TW); Way-Han Dai, New Taipei (TW); Shao-Chun Chao, New Taipei (TW)

(73) Assignee: FOSITEK CORPORATION, New Taipei (TW)

(*) Notice: Subject to any disclaimer, the term of this patent is extended or adjusted under 35 U.S.C. 154(b) by 0 days.

(21) Appl. No.: 16/385,673

(22) Filed: Apr. 16, 2019

(30) Foreign Application Priority Data

Dec. 25, 2018 (TW) .............................. 107146946 A

(51) Int. Cl.
*G06F 1/16* (2006.01)
*E05D 3/12* (2006.01)
*E05D 7/00* (2006.01)

(52) U.S. Cl.
CPC ............ *E05D 3/12* (2013.01); *E05D 7/0045* (2013.01); *G06F 1/1616* (2013.01); *G06F 1/1681* (2013.01); *E05Y 2900/606* (2013.01)

(58) Field of Classification Search
CPC .................................................. G06F 1/1681
See application file for complete search history.

(56) References Cited

U.S. PATENT DOCUMENTS

| | | | | |
|---|---|---|---|---|
| 3,908,923 A * | 9/1975 | Salgo | ................. | B65H 19/2253 242/421.2 |
| 5,229,921 A * | 7/1993 | Bohmer | ................ | G06F 1/1679 16/324 |
| 8,804,349 B2 * | 8/2014 | Lee | ........................ | G06F 1/1641 361/749 |
| 2004/0137970 A1 * | 7/2004 | Han | ...................... | G06F 1/1616 455/575.3 |
| 2005/0155182 A1 * | 7/2005 | Han | ...................... | H04M 1/022 16/336 |
| 2012/0236484 A1 * | 9/2012 | Miyake | ................. | G06F 1/1616 361/679.01 |
| 2015/0378397 A1 * | 12/2015 | Park | ...................... | G06F 1/1652 361/679.27 |
| 2017/0145725 A1 * | 5/2017 | Siddiqui | .................. | E05F 3/20 |

* cited by examiner

*Primary Examiner* — Adrian S Wilson
(74) *Attorney, Agent, or Firm* — Birch, Stewart, Kolasch & Birch, LLP

(57) ABSTRACT

A flexible electronic device includes a flexible display, a support structure and two hinge mechanisms. Each hinge mechanism includes a cam and first and second arm units. With the hinge mechanism having first and second cam follower protrusions of the first and second arm units which are moved from respective cavities of the cam and slide on respective peripheral cam surface sections of the cam during the pivoting of the first and second movable arms from an unfolded position to a folded position, a leeway is provided between the first and second movable arms for the flexible display to be bendably received therein.

11 Claims, 15 Drawing Sheets

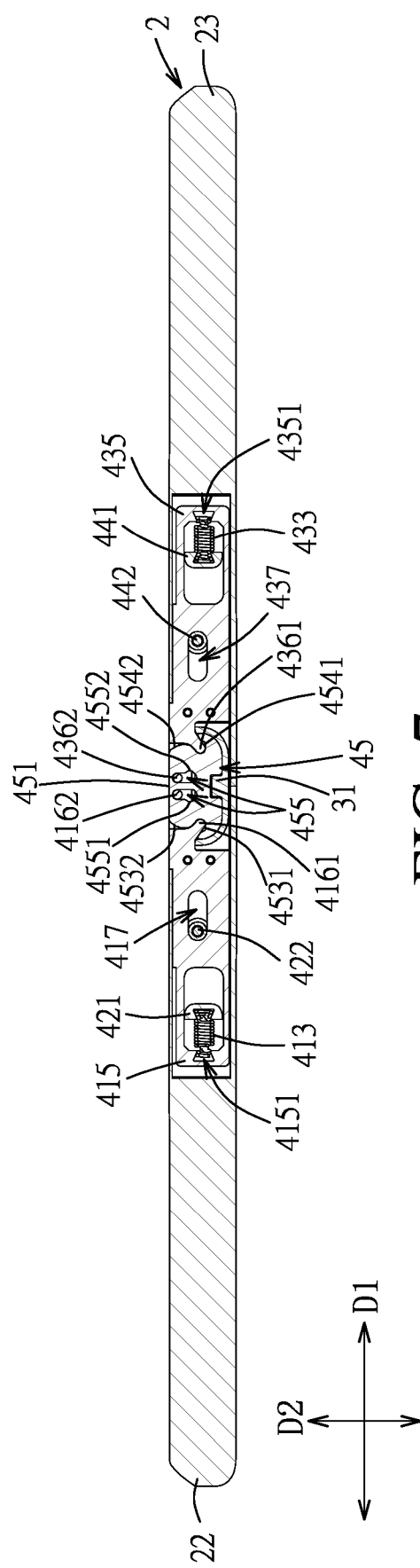
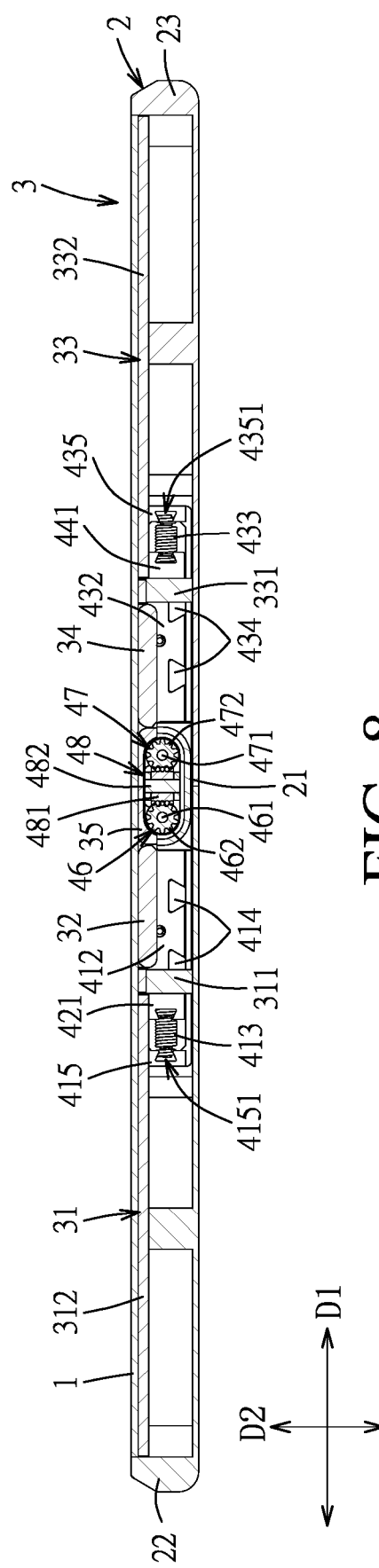
FIG. 7
FIG. 8

HINGE MECHANISM AND FLEXIBLE ELECTRONIC DEVICE HAVING THE SAME

CROSS-REFERENCE TO RELATED APPLICATION

This application claims priority of Taiwanese Patent Application No. 107146946, filed on Dec. 25, 2018.

FIELD

The disclosure relates to a hinge mechanism, and more particularly to a hinge mechanism for a flexible electronic device and a flexible electronic device having the same.

BACKGROUND

In recent years, there has been a growing interest from numerous consumer electronics manufacturers in applying the flexible display technology to mobile phones, tablets, and other consumer electronic devices.

Such electronic devices generally each have two substrates for mounting a flexible display thereon, and at least one hinge mechanism disposed between the substrates to permit rotation of the substrates so as to fold and unfold the flexible display. When the flexible display is folded, an additional receiving space within the hinge mechanism is required for receiving a bending portion of the flexible display to prevent damage to the flexible display.

SUMMARY

Therefore, an object of the disclosure is to provide a hinge mechanism and a flexible electronic device that can alleviate at least one of the drawbacks of the prior art.

According to the disclosure, the hinge mechanism includes a cam, a first arm unit and a second arm unit. The cam extends in a left-and-right direction to have left and right sides, and a middle portion interposed between the left and right sides. The cam has two adjusting slots which are formed in the middle portion and spaced apart from each other in the left-and-right direction, two arcuate surface sections which are respectively disposed on the left and right sides and face upwardly, and two peripheral cam surface sections which are respectively disposed on the left and right sides and respectively face the arcuate surface sections to cooperatively define two retaining cavities. The first arm unit includes a first movable arm which has first proximate and distal ends relative to the left side of the cam, a first cam follower protrusion that is disposed on the first proximate end and movably received in one of the retaining cavities, and a first peg that extends in a front-and-rear direction transverse to the left-and-right direction and that is engaged in and movable relative to one of the adjusting slots. The second arm unit includes a second movable arm which has second proximate and distal ends relative to the right side of the cam, a second cam follower protrusion that is disposed on the second proximate end and movably received in the other one of the retaining cavities, and a second peg that extends in the front-and-rear direction and that is engaged in and movable relative to the other one of the adjusting slots such that the first and second movable arms are pivotable relative to each other between an unfolded position, where the first and second distal ends are remote from each other to have the first and second movable arms extending parallel to each other along the left-and-right direction and where the first and second cam follower protrusions are respectively received in the retaining cavities, and a folded position, where the first and second distal ends are close to each other and have the first and second movable arms extending in an up-and-down direction that is transverse to both the left-and-right direction and the front-and-rear direction, and where the first and second cam follower protrusions are respectively disengaged from and disposed upwardly of the retaining cavities, and such that during the pivoting of the first and second movable arms from the unfolded position to the folded position, each of the first and second cam follower protrusions is moved from the respective cavity and slides on a respective one of the peripheral cam surface sections so as to provide a leeway between the first and second movable arms.

According to the disclosure, the flexible electronic device includes a flexible display, a support structure and two hinge mechanisms. The support structure includes first and second substrate units which are juxtaposed and spaced apart from each other in a left-and-right direction, a first mounting plate which is movably connected with the first substrate unit and interposed between the first and second substrate units, and a second mounting plate which is movably connected with the second substrate unit and interposed between the first mounting plate and the second substrate unit. The first and second substrate units and the first and second mounting plates are coplanar to cooperatively define a display supporting surface for the flexible display to be attached thereto. The hinge mechanisms are disposed between the first and second substrate units and opposite to each other in a front-and-rear direction transverse to the left-and-right direction. Each of the hinge mechanisms includes a cam, a first arm unit and a second arm unit. The cam extends in the left-and-right direction to have left and right sides, and a middle portion interposed between the left and right sides. The cam has two adjusting slots which are formed in the middle portion and spaced apart from each other in the left-and-right direction, two arcuate surface sections which are respectively disposed on the left and right sides and face upwardly, and two peripheral cam surface sections which are respectively disposed on the left and right sides and respectively face the arcuate surface sections to cooperatively define two retaining cavities. The first arm unit includes a first movable arm which has first proximate and distal ends relative to the left side of the cam, a first cam follower protrusion that is disposed on the first proximate end and movably received in one of the retaining cavities, and a first peg that extends in the front-and-rear direction and that is engaged in and movable relative to one of the adjusting slots. The second arm unit includes a second movable arm which has second proximate and distal ends relative to the right side of the cam, a second cam follower protrusion that is disposed on the second proximate end and movably received in the other one of the retaining cavities, and a second peg that extends in the front-and-rear direction and that is engaged in and movable relative to the other one of the adjusting slots such that the first and second movable arms are pivotable relative to each other between an unfolded position, where the first and second distal ends are remote from each other to have the first and second movable arms extending parallel to each other along the left-and-right direction and where the first and second cam follower protrusions are respectively received in the retaining cavities, and a folded position, where the first and second distal ends are close to each other and have the first and second movable arms extending in an up-and-down direction that is transverse to both the left-and-right direction and the front-and-rear direction, and where the first and second cam follower protrusions are respectively disengaged from and disposed upwardly of the retaining cavities, and such that during the pivoting of the first and second movable arms from the unfolded position to the folded position, each of the first and second cam follower protrusions is moved from the respective cavity and slides on a respective one of the peripheral cam surface sections to move each of the first and second movable arms away from the cam and to bring each of the first and second substrate units distant from a respective one of the first and second mounting plates by a distance so as to provide a leeway between the first and second substrate units for the flexible display to be bendably received therein.

BRIEF DESCRIPTION OF THE DRAWINGS

Other features and advantages of the disclosure will become apparent in the following detailed description of the embodiment with reference to the accompanying drawings, of which:

FIG. 7 is a sectional view taken along line VII-VII of FIG. 6;

FIG. 8 is a sectional view taken along line VIII-VIII of FIG. 6;

DETAILED DESCRIPTION

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

Figure 1:
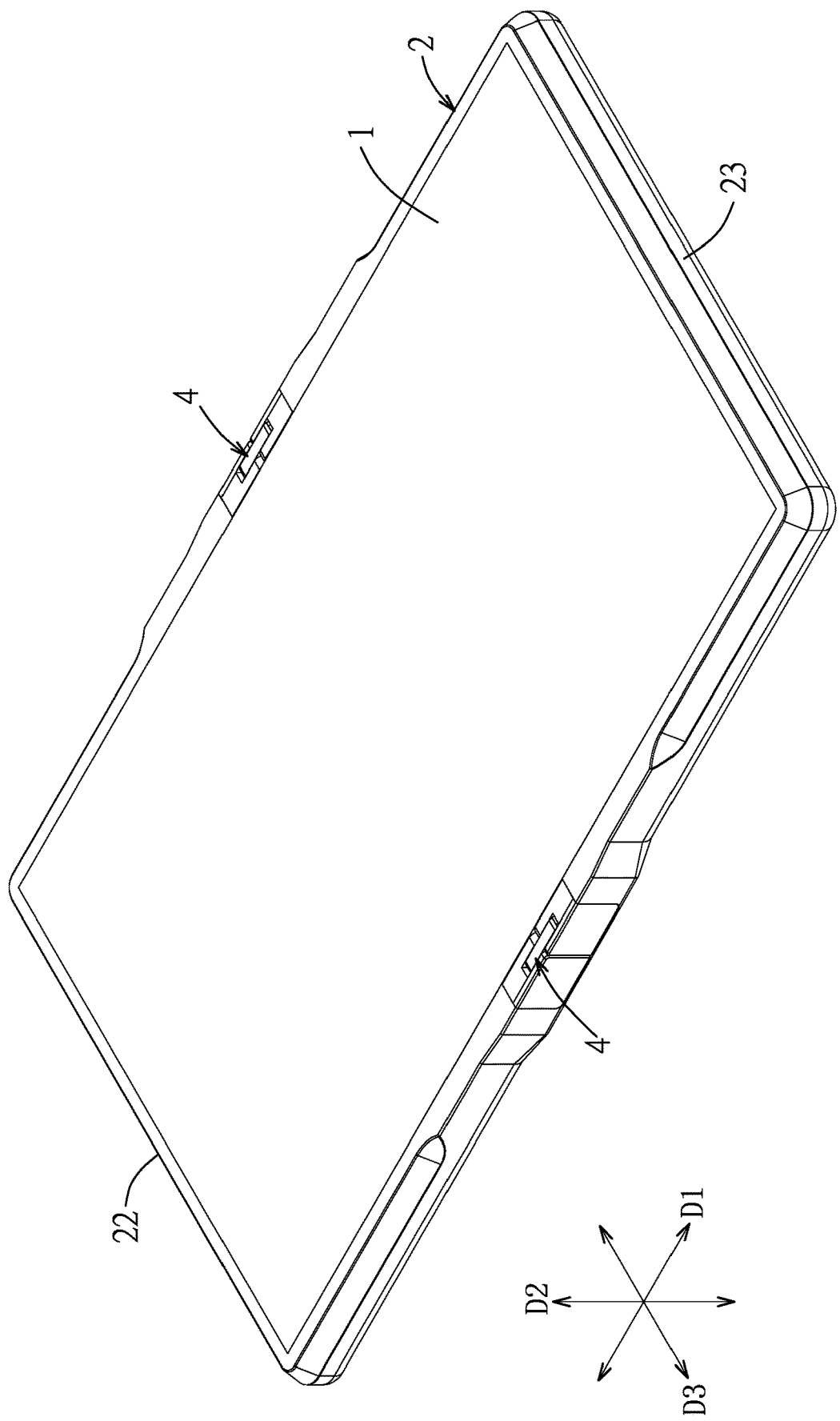
FIG. 1 is a perspective view illustrating an embodiment of a flexible electronic device according to the disclosure in an unfolded state.
Figure 2:
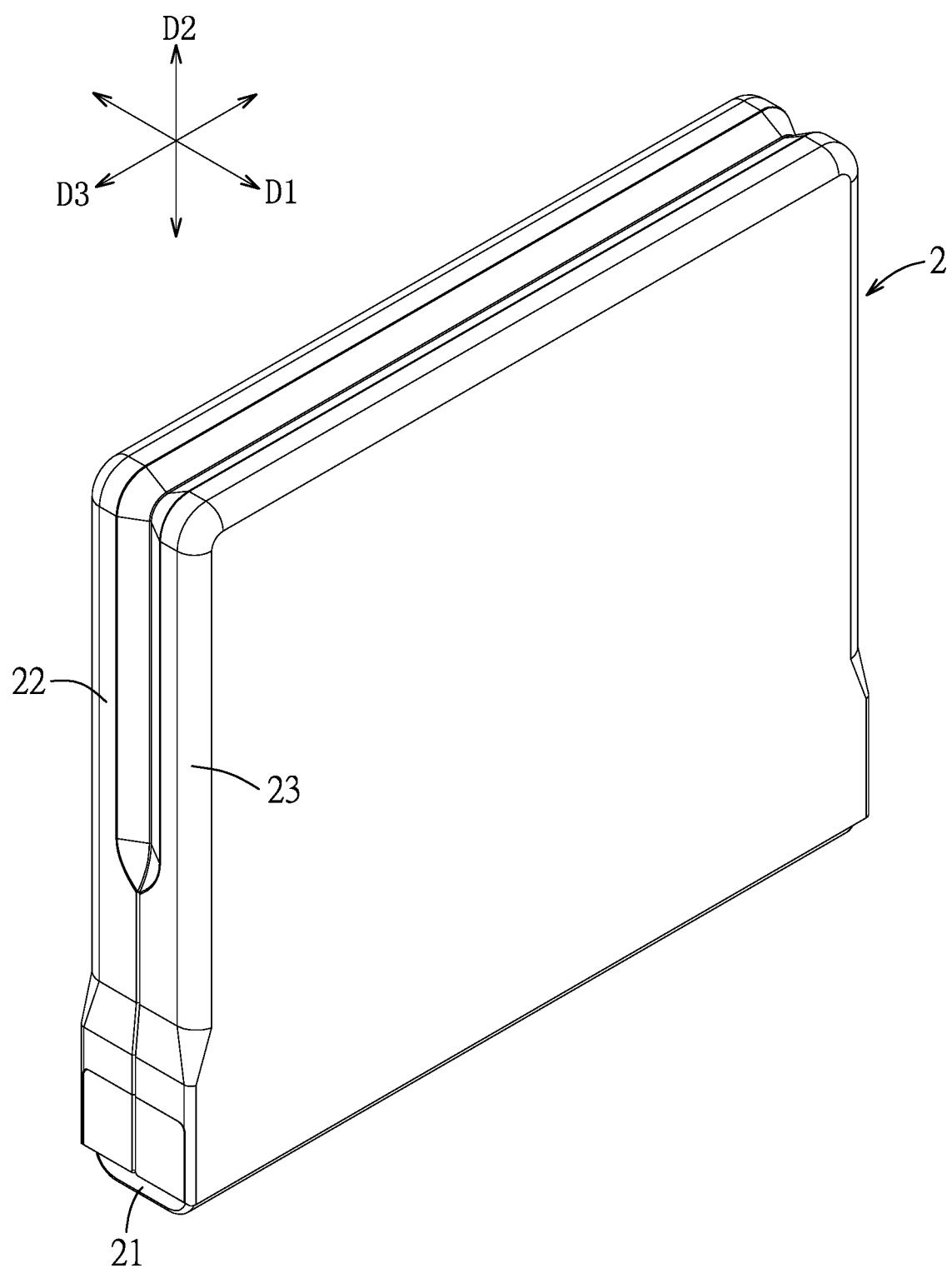
FIG. 2 is a perspective view of the embodiment in a folded state.
Figure 3:
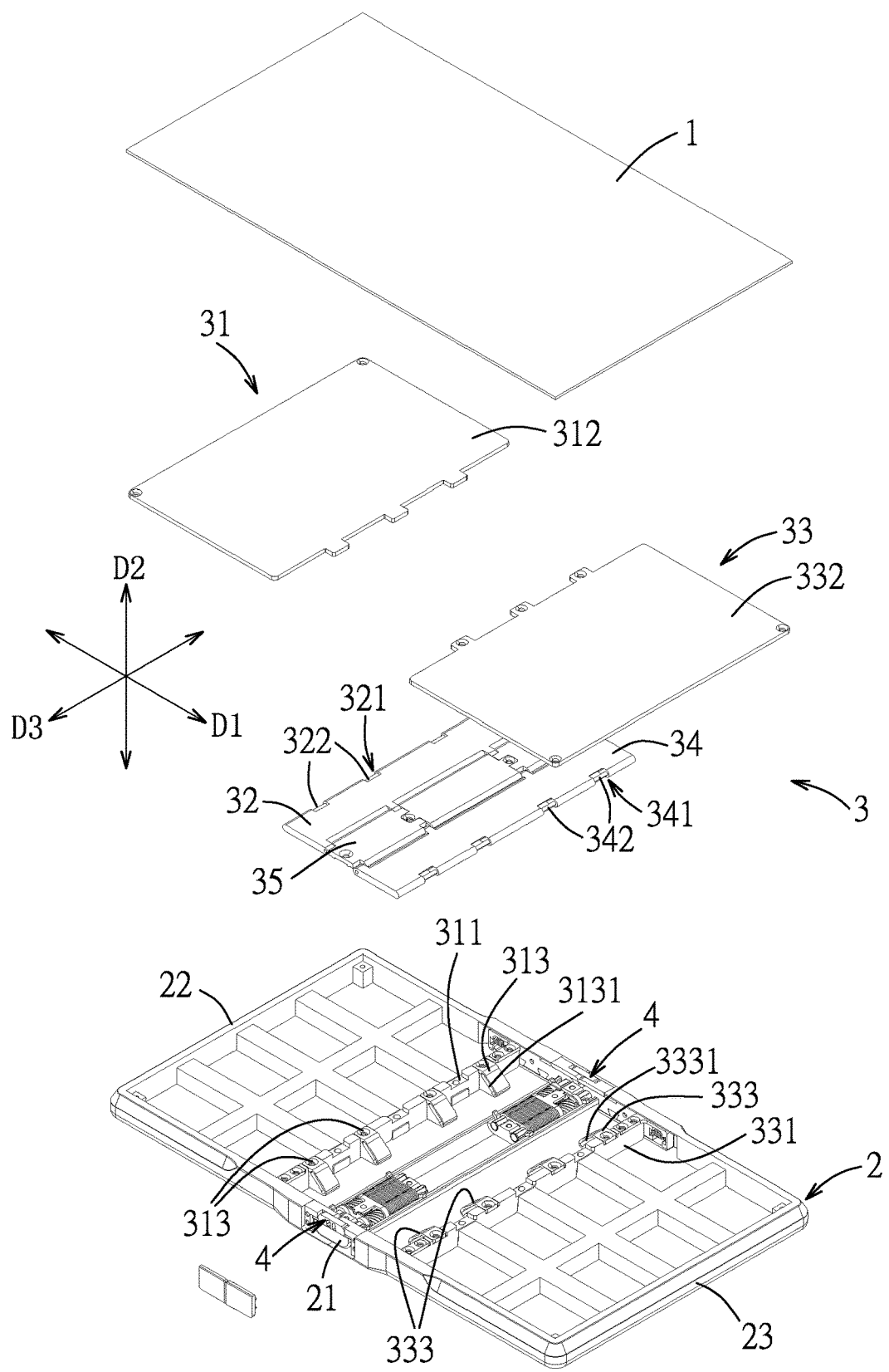
FIG. 3 is a partially exploded perspective view of the embodiment.
Figure 6:
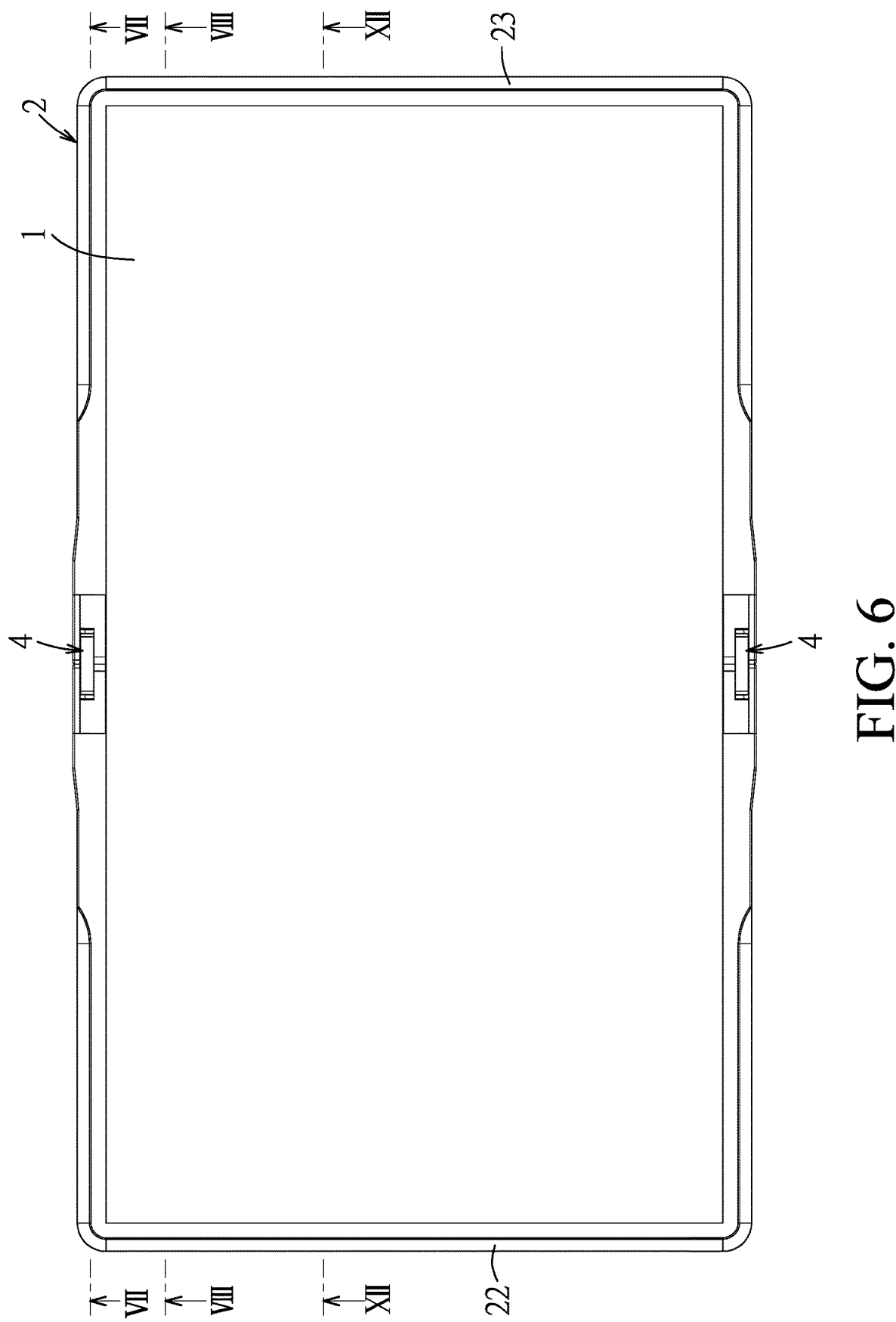
FIG. 6 is atop view of the embodiment in the unfolded state.
Figure 13:
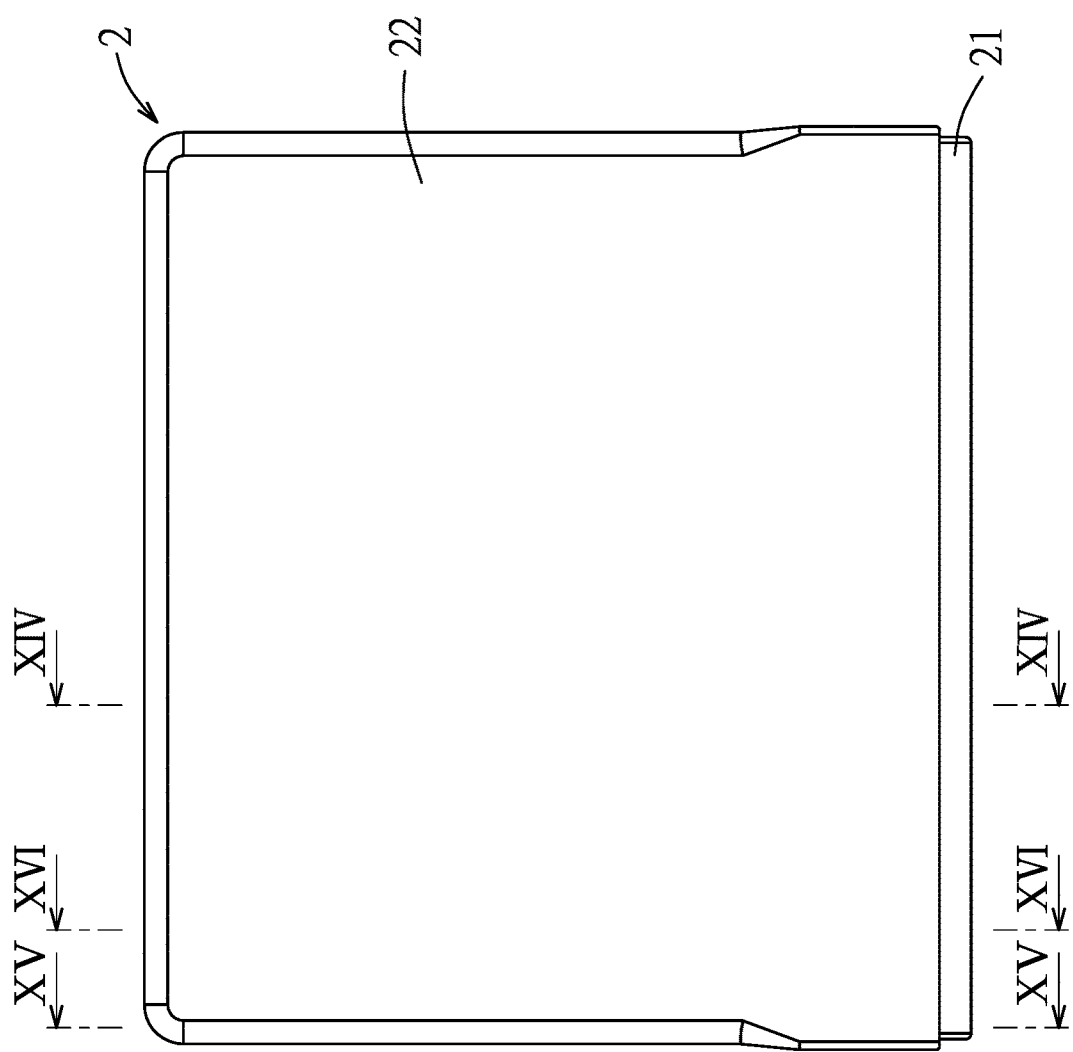
FIG. 13 is a top view of the embodiment in the folded state.
Figure 14:
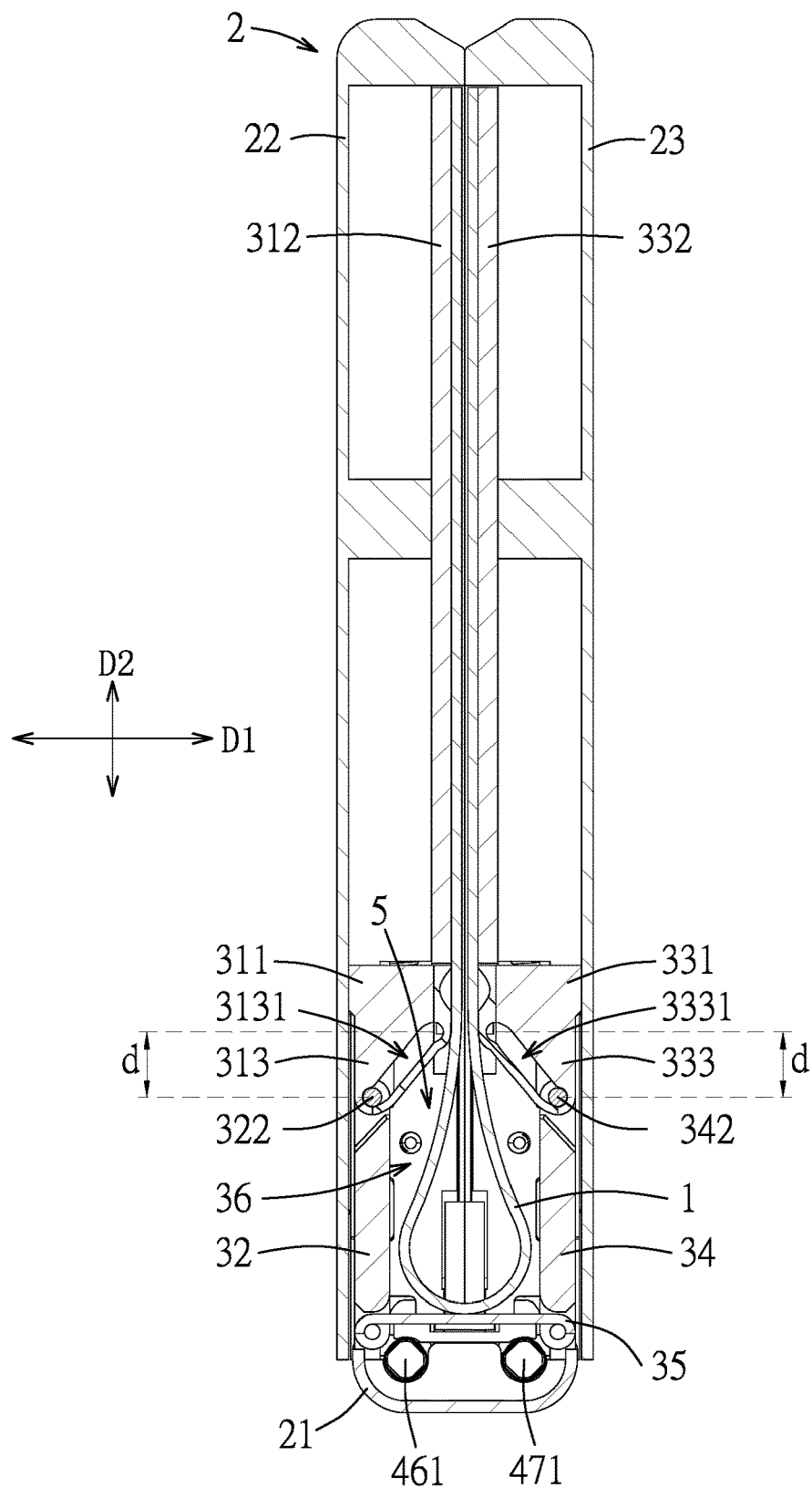
FIG. 14 is a sectional view taken along line XIV-XIV of FIG. 13.
Figure 15:
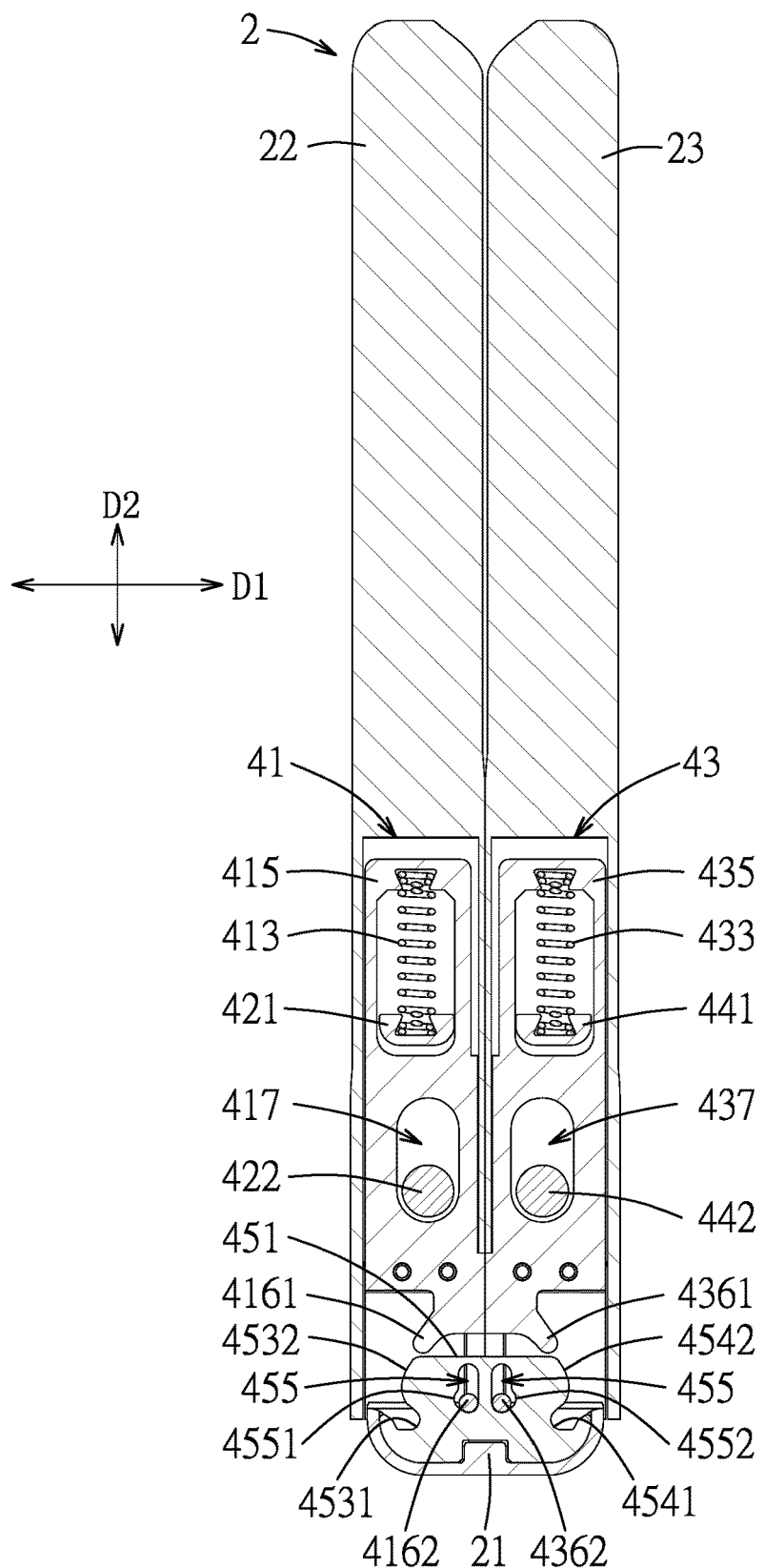
FIG. 15 is a sectional view taken along line XV-XV of FIG. 13.

Referring to FIGS. 1 to 3, an embodiment of a flexible electronic device according to the disclosure includes a flexible display 1, a casing structure 2, a support structure 3 and two hinge mechanisms 4. In this embodiment, the electronic device is a tablet PC having the flexible display 1 attached to an upper display supporting surface of the support structure 3. The casing structure 2 is disposed for mounting the support structure 3, the hinge mechanisms 4, associated circuit boards and other electronic elements. The hinge mechanisms 4 are disposed to permit the flexible electronic device to be operable between an unfolded state (as shown in FIGS. 1 and 6) and a folded state (as shown in FIGS. 2 and 13) and also to angularly position the flexible electronic device at a desired state. In the folded state, the hinge mechanisms 4 can provide a bending space for receiving a bending portion of the flexible display 1 to prevent damage to the flexible display 1. In other embodiments, the flexible electronic device may be a mobile phone, a portable PC, and so forth which have the flexible display 1.

With reference to FIGS. 1 to 4, the casing structure 2 includes a first casing 22 and a second casing 23 for mounting the support structure 3. The hinge mechanisms 4 respectively include base seats 21 which are disposed between the first and second casings 22, 23. In this embodiment, the base seats 21 are connected and integrally formed with each other. In the unfolded state, two adjacent side edges of the first and second casings 22, 23 abut against each other to conceal the base seats 21. In the folded state, the first and second casings 22, 23 are close to each other to expose the base seats 21. Each of the base seats 21 has two pairs of pivot slots 211 formed in an upper major wall thereof.

The support structure 3 includes first and second substrate units 31, 33 which are juxtaposed and spaced apart from each other in a left-and-right direction (D1), a first mounting plate 32 which is movably connected with the first substrate unit 31 and interposed between the first and second substrate units 31, 33, a second mounting plate 34 which is movably connected with the second substrate unit 33 and interposed between the first mounting plate 32 and the second substrate unit 33, and a base plate 35 which is interposed between and pivotably connected with the first and second mounting plates 32, 34. The first and second substrate units 31, 33, the first and second mounting plates 32, 34, and the base plate 35 are coplanar to cooperatively define the upper display supporting surface for the flexible display 1 to be attached thereto.

More particularly, the first substrate unit 31 has a first elongated seat 311, a first support substrate 312 and a plurality of first connecting blocks 313. The first elongated seat 311 extends in a front-and-rear direction (D3) transverse to the left-and-right direction (D1) to terminate at front and rear end portions, and is securely mounted on an upper major surface of the first casing 22 by means of screws. The first support substrate 312 is rectangular, and has a side edge securely connected with the first elongated seat 311 to have an upper surface coplanar with an upper surface of the first elongated seat 311 for mounting the flexible display 1 thereon. The first connecting blocks 313 are disposed between the front and rear end portions of the first elongated seat 311 and are spaced apart from each other in the front-and-rear direction (D3). Each of the first connecting blocks 313 has a first inclined slot 3131 that is inclined relative to the base plate 35. In this embodiment, the first mounting plate 32 is formed with a plurality of first notches 321 at a remote side relative to the base plate 35, and has a plurality of first connecting pins 322 which are respectively disposed in the first notches 321 and which are respectively and movably engaged with the first inclined slots 3131 to allow the movement of the first substrate unit 31 relative to the first mounting plate 32. Also, the first mounting plate 32 is pivotable relative to the base plate 35 with the movement of the first substrate unit 31.

Figure 16:
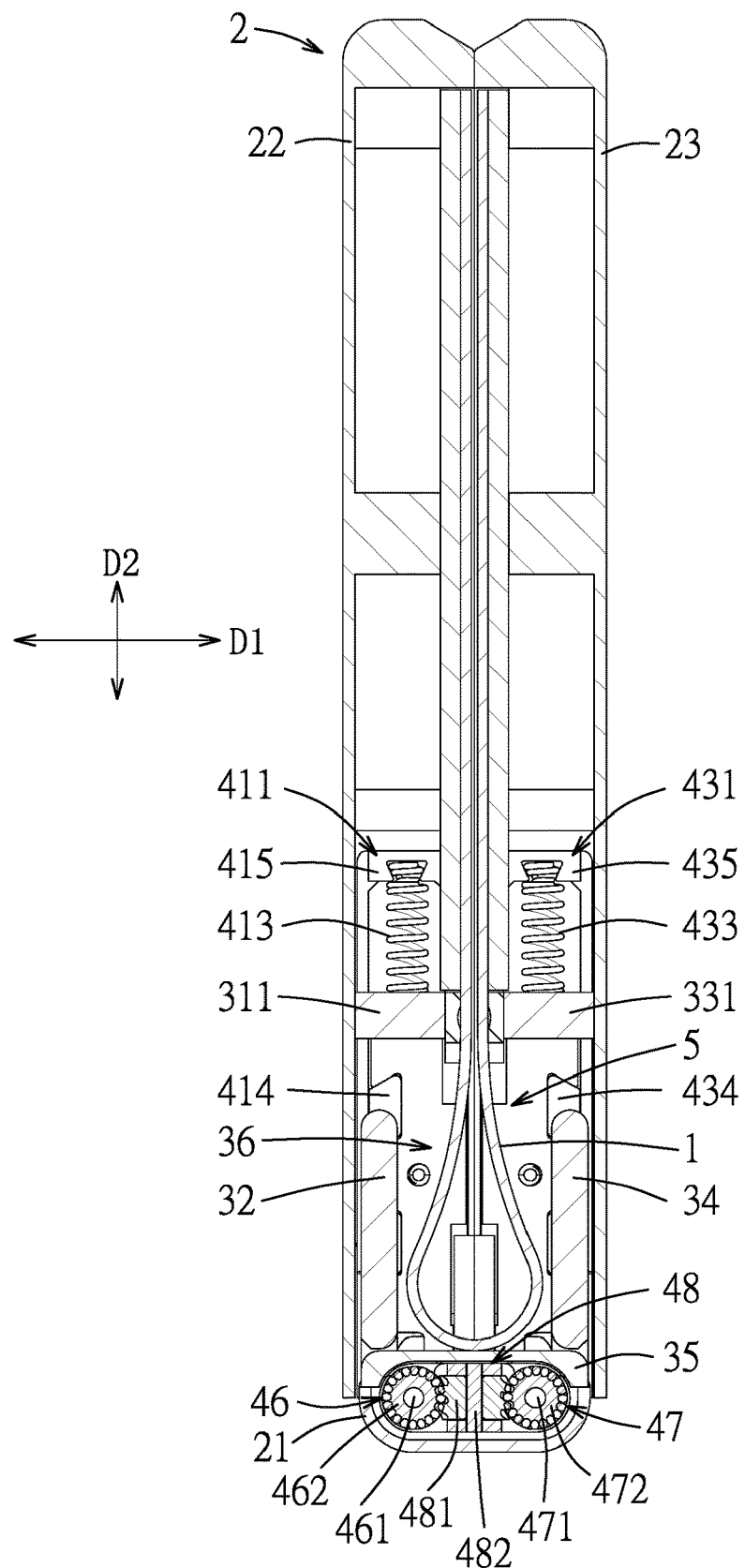
FIG. 16 is a sectional view taken along line XVI-XVI of FIG. 13.

Similarly, the second substrate unit 33 has a second elongated seat 331, a second support substrate 332 and a plurality of second connecting blocks 333. The second elongated seat 331 extends in the front-and-rear direction (D3) to terminate at front and rear end portions, and is securely mounted on an upper major surface of the second casing 23 by means of screws. The second support substrate 332 is rectangular, and has a side edge securely connected with the second elongated seat 331 to have an upper surface coplanar with an upper surface of the second elongated seat 331. The second connecting blocks 333 are disposed between the front and rear end portions of the second elongated seat 331 and are spaced apart from each other in the front-and-rear direction (D3). Each of the second connecting blocks 333 has a second inclined slot 3331 that is inclined relative to the base plate 35. In this embodiment, the second mounting plate 34 is formed with a plurality of second notches 341 at a remote side relative to the base plate 35, and has a plurality of second connecting pins 342 which are respectively disposed in the second notches 341 and which are respectively and movably engaged with the second inclined slots 3331 to allow the movement of the second substrate unit 33 relative to the second mounting plate 34. Also, the second mounting plate 34 is pivotable relative to the base plate 35 with the movement of the second substrate unit 33. In the folded state, as shown in FIG. 16, the first and second mounting plates 32, 34 are pivoted relative to the base plate 35 to form as a U-shape with a bending space 36 for receiving a bending portion of the flexible display 1 to protect the bending portion of the flexible display 1 from overbending.

Figure 5:
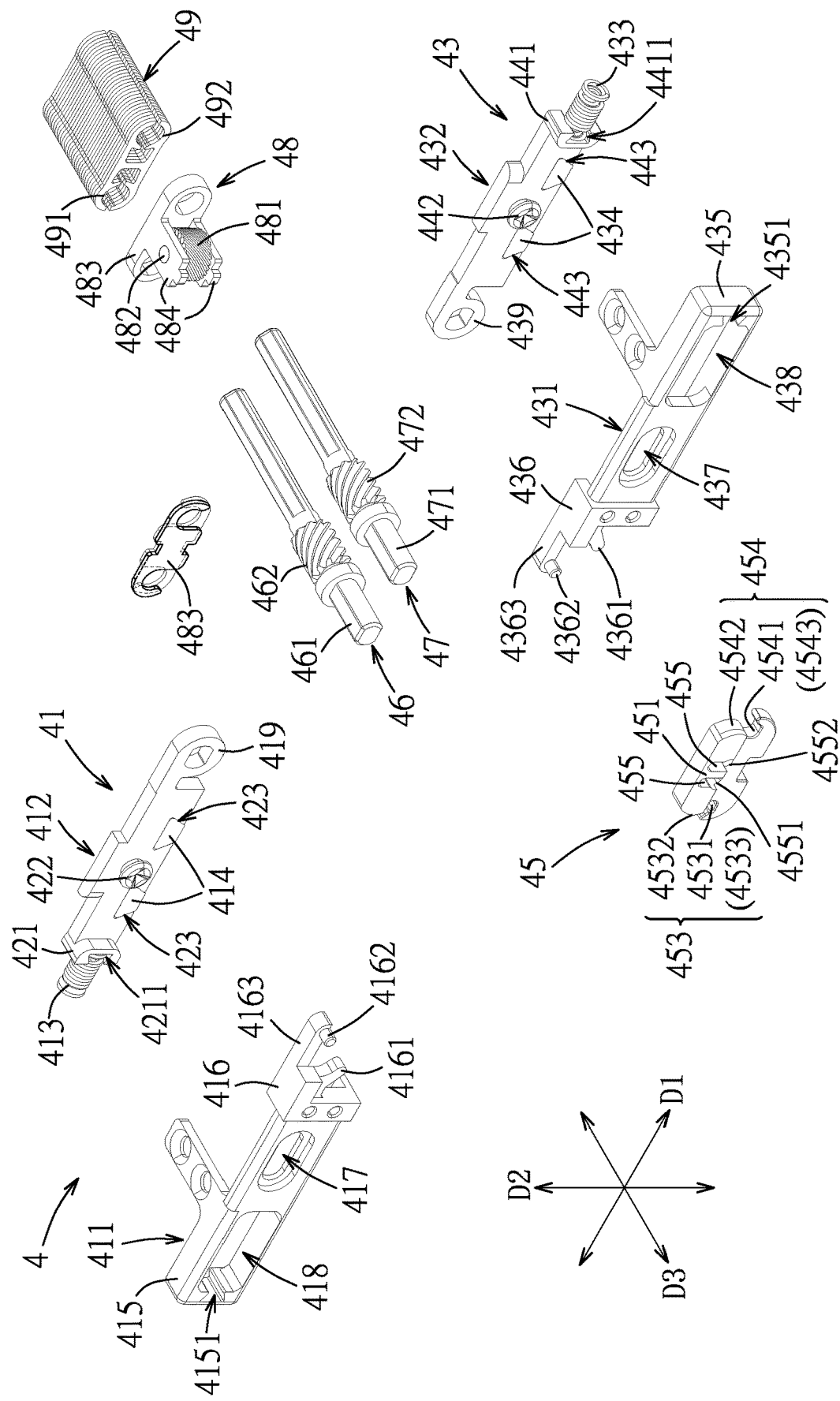
FIG. 5 is an exploded perspective view illustrating the hinge mechanism.

In this embodiment, the hinge mechanisms 4 are symmetrically disposed between the first and second substrate units 31, 33 and opposite to each other in the front-and-rear direction (D3). With reference to FIG. 5, each of the hinge mechanisms 4 includes a cam 45, first and second arm units 41, 43, first and second coupling units 46, 47, a synchronously driving unit 48, and first and second friction increasing structures 491, 492.

Figure 9:
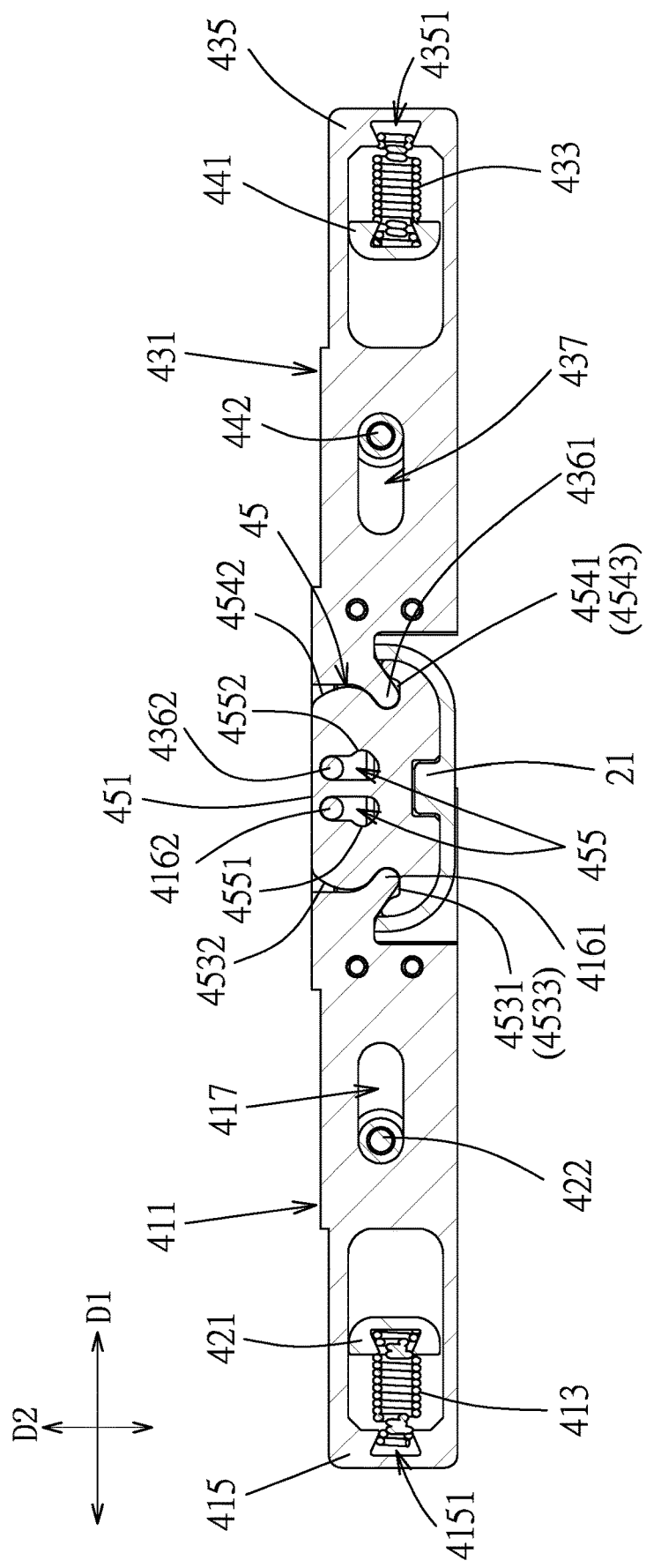
FIG. 9 is a sectional view illustrating the hinge mechanism in a state when first and second arm units thereof are in an unfolded position.

Referring to FIGS. 5 and 9, the cam 45 extends in the left-and-right direction (D1) to have left and right sides 453, 454, and a middle portion 451 interposed between the left and right sides 453, 454. The cam 45 has two adjusting slots 455 which are formed in the middle portion and spaced apart from each other in the left-and-right direction (D1), two arcuate surface sections 4531, 4541 which are respectively disposed on the left and right sides and face upwardly, and two peripheral cam surface sections 4532, 4542 which are respectively disposed on the left and right sides 453, 454 and respectively face the arcuate surface sections 4531, 4541 to cooperatively define two retaining cavities 4533, 4543. Each of the adjusting slots 455 is elongated in an up-and-down direction (D2) that is transverse to both the left-and-right direction (D1) and the front-and-rear direction (D3). Left and right arcuate surface segments 4551, 4552 are respectively formed in the adjusting slots 455 adjacent to lower portions thereof.

The first arm unit 41 includes a first movable arm 411, a first stationary arm 412, a first spring 413 and a plurality of first spacers 414.

Figure 4:
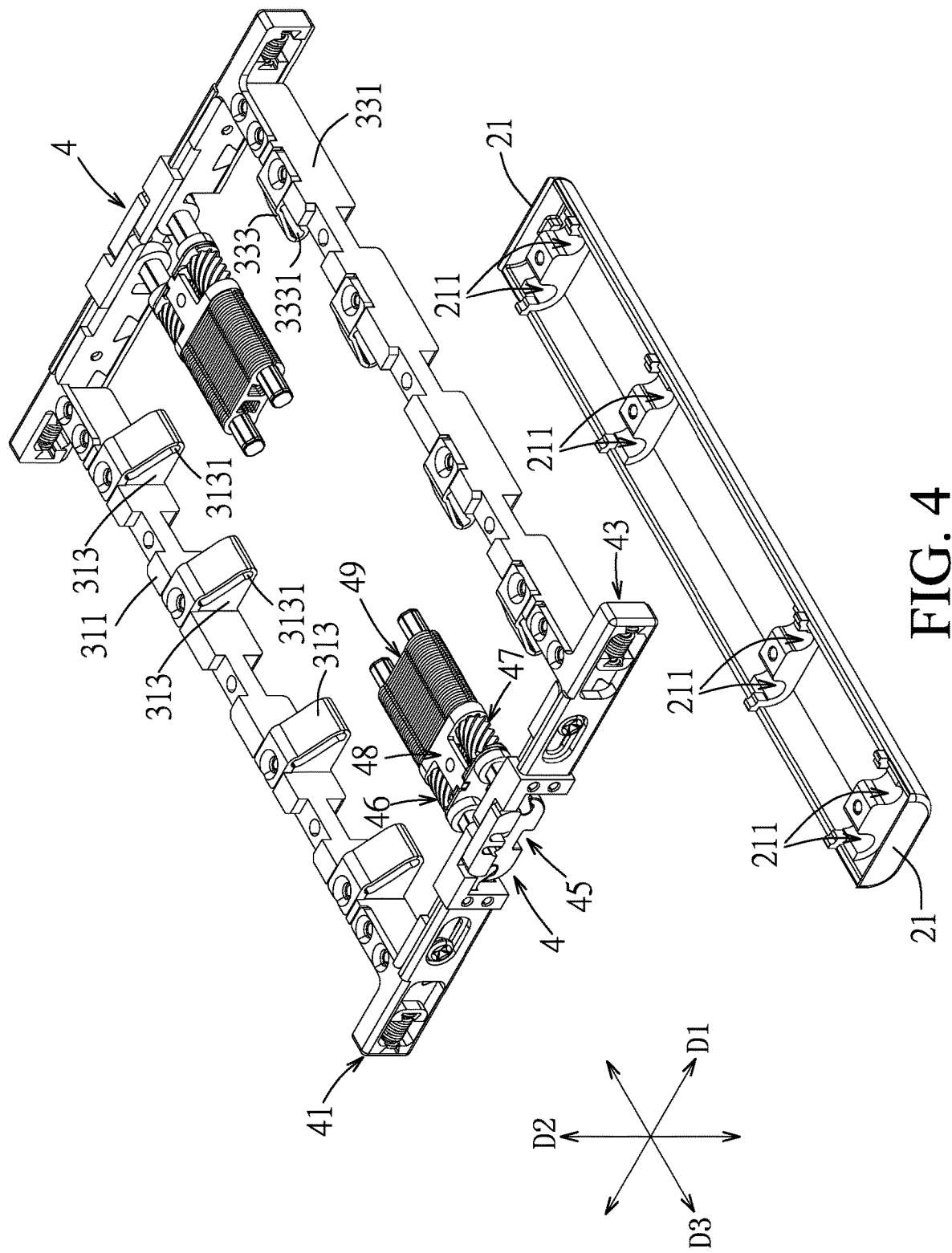
FIG. 4 is a partially exploded perspective view illustrating two hinge mechanisms and a support structure of the embodiment.

With reference to FIGS. 5 and 7, the first movable arm 411 has first proximate and distal ends 416, 415 relative to the left side 453 of the cam 45. The distal ends 415 of the first arm units 41 of the hinge mechanisms 4 are respectively and securely engaged with the front and rear end portions of the first elongated seat 311, as shown in FIGS. 3 and 4. A first cam follower protrusion 4161 is disposed on the first proximate end 416 and is movably received in the retaining cavity 4533 of the cam 45. A first extension arm 4163 extends from the first proximate end 416 to overlap with the cam 45 (see FIG. 9) and to terminate at a first peg 4162 which extends in the front-and-rear direction (D3) and which is engaged in and movable relative to one of the adjusting slots 455. The first movable arm 411 has a sliding slot 417 elongated to terminate at two opposite closed ends, and a first receiving slot 418 for receiving the first spring 413 and part of the first stationary arm 412. A dovetail slot 4151 is formed in an end wall of the first receiving slot 418 adjacent to the first distal end 415.

Referring to FIGS. 5, 7 and 8, the first stationary arm 412 is connected to and permits movement of the first movable arm 411 relative thereto, and has a cam-side end 419, a spring-side end 421 opposite to the cam-side end 419, and a sliding peg 422 which is extended into and slidable along the sliding slot 417 to guide the movement of the first movable arm 411 relative to the first stationary arm 412 and to limit the distance of the movement by the closed ends of the sliding slot 417. In this embodiment, the spring-side end 421 is disposed in the first receiving slot 418, and has a dovetail slot 4211 facing the dovetail slot 4151. The sliding peg 422 may be in the form of a screw mounted on the first stationary arm 412. Two first mounting notches 423 are formed in a lower side edge of the first stationary arm 412 and are spaced apart from each other in the left-and-right direction (D1).

The first spring 413 has two spring ends respectively engaged in the dovetail slots 4151, 4211.

The first spacers 414 are respectively disposed in the first mounting notches 423 and extend to abut against the first movable arm 411 when the first movable arm 411 is moved relative to the first stationary arm 412 so as to prevent undesired frictional engagement between the interacting surfaces of the first movable and stationary arms 411, 412 during the movement.

Referring to FIGS. 5 and 7, the second arm unit 43 includes a second movable arm 431, a second stationary arm 432, a second spring 433 and a plurality of second spacers 434.

The second movable arm 431 has second proximate and distal ends 436, 435 relative to the right side 454 of the cam 45. The distal ends 435 of the second arm units of the hinge mechanisms 4 are respectively and securely engaged with the front and rear end portions of the second elongated seat 331, as shown in FIGS. 3 and 4. A second cam follower protrusion 4361 is disposed on the second proximate end 436 and is movably received in the retaining cavity 4543 of the cam 45. A second extension arm 4363 extends from the second proximate end 436 to overlap with the cam 45 (see FIG. 9) and to terminate at a second peg 4362 which extends in the front-and-rear direction (D3) and which is engaged in and movable relative to the other one of the adjusting slots 455. The second movable arm 431 has a sliding slot 437 elongated to terminate at two opposite closed ends, and a second receiving slot 438 for receiving the second spring 433 and part of the second stationary arm 432. A dovetail slot 4351 is formed in an end wall of the second receiving slot 438 adjacent to the second distal end 435.

Referring to FIGS. 5, 7 and 8, the second stationary arm 432 is connected to and permits movement of the second movable arm 431 relative thereto, and has a cam-side end 439, a spring-side end 441 opposite to the cam-side end 439, and a sliding peg 442 which is extended into and slidable along the sliding slot 437 to guide the movement of the second movable arm 431 relative to the second stationary arm 432 and to limit the distance of the movement by the closed ends of the sliding slot 437. In this embodiment, the spring-side end 441 is disposed in the second receiving slot 438, and has a dovetail slot 4411 facing the dovetail slot 4351. The sliding peg 442 may be in the form of a screw mounted on the second stationary arm 432. Two second mounting notches 443 are formed in a lower side edge of the second stationary arm 432 and are spaced apart from each other in the left-and-right direction (D1).

The second spring 433 has two spring ends respectively engaged in the dovetail slots 4351, 4411.

The second spacers 434 are disposed in the second mounting notches 443 and extend to abut against the second movable arm 431 when the second movable arm 431 is moved relative to the second stationary arm 432 so as to prevent undesired frictional engagement between the interacting surfaces of the second movable and stationary arms 431, 432 during the movement.

Figure 10:
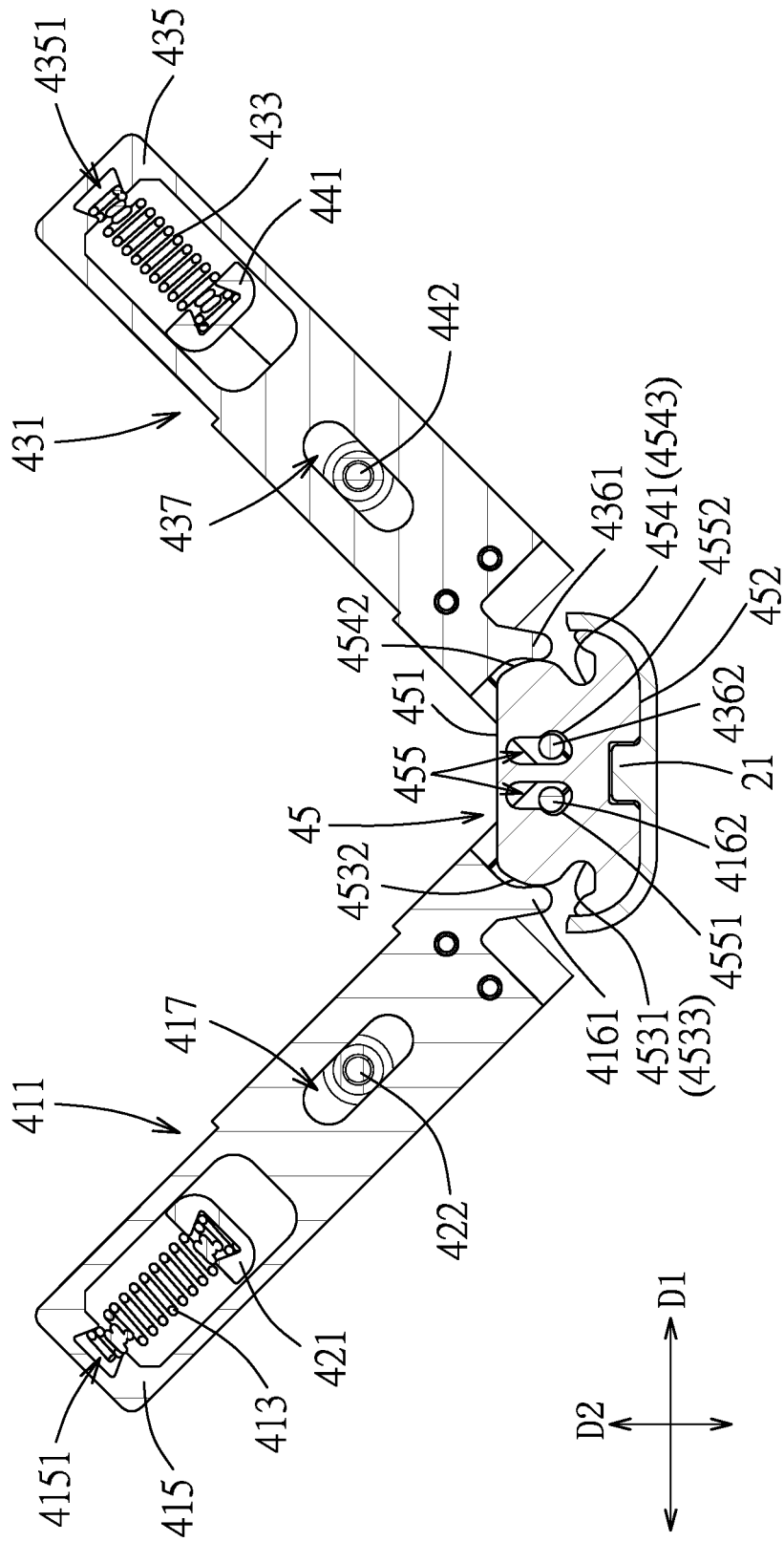
FIG. 10 is a sectional view illustrating a state when the first and second arm units are being pivoted between the unfolded and folded positions.
Figure 11:
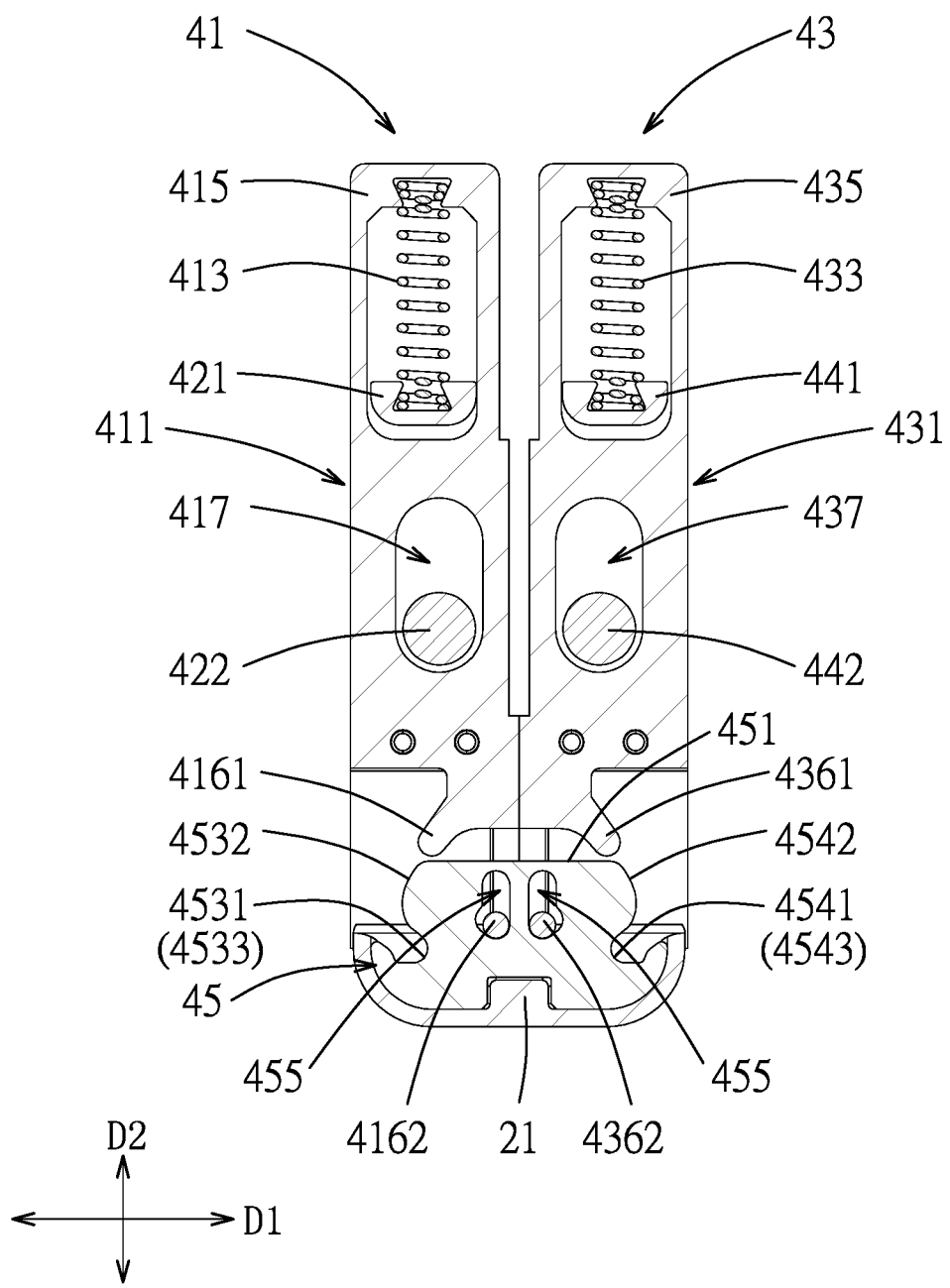
FIG. 11 is a sectional view illustrating the hinge mechanism in a state when the first and second arm units are in the folded position.

As shown in FIG. 9, when the first and second movable arms 411, 431 are in an unfolded position, the first and second distal ends 415, 435 are remote from each other to have the first and second movable arms 411, 431 extending parallel to each other along the left-and-right direction (D1), and the first and second cam follower protrusions 4161, 4361 are respectively received in the retaining cavities 4533, 4543. As shown in FIG. 10, when the first and second movable arms 411, 431 are pivoted relative to each other from the unfolded position to a folded position, the first and second cam follower protrusions 4161, 4361 are respectively moved out of the retaining cavities 4533, 4543 and slide on and along the peripheral cam surface sections 4532, 4542, respectively, so as to move laterally away from each other. Meanwhile, the first and second pegs 4162, 4362 are in movable engagement with the adjusting slots 455 from upper portions of the adjusting slots 455 to the lower portions of the adjusting slots 455 respectively through the left and right arcuate surface segments 4551, 4552. As shown in FIG. 11, when the first and second movable arms 411, 431 are in the folded position, the first and second distal ends 415, 435 are close to each other and have the first and second movable arms 411, 431 extending in the up-and-down direction (D2), and the first and second pegs 4162, 4362 are respectively disengaged from and disposed upwardly of the retaining cavities 4533, 4543.

Specifically, referring to FIG. 9, with the elongated adjusting slots 455 having the left and right arcuate surface segments 4551, 4552 formed near the lower portions thereof, the first and second pegs 4162, 4362 can be movably engaged therein to allow the sliding movement of the first and second cam follower protrusions 4161, 4361 on and along the peripheral cam surface sections 4532, 4542 during the pivoting of the first and second movable arms 411, 431.

Referring to FIGS. 4, 5 and 8, the first and second coupling units 46, 47 are pivotably mounted on the respective base seat 21, and are driven to rotate with the first and second arm units 41, 43, respectively, during the pivoting of the first and second movable arms 411, 431. Specifically, the first coupling unit 46 includes a first pivot shaft 461 which is pivotably connected to the pivot slots 211 of the base seat 21 about a first pivot axis in the front-and-rear direction (D3), and which is engaged with the cam-side end 419 of the first stationary arm 412, and a first gear 462 which is disposed on and rotatable with the first pivot shaft 461. In this embodiment, the first gear 462 is a spiral bevel gear. Similarly, the second coupling unit 47 includes a second pivot shaft 471 which is pivotably connected to the pivot slots 211 of the base seat 21 about a second pivot axis in the front-and-rear direction (D3), and which is engaged with the cam-side end 439 of the second stationary arm 432, and a second gear 472 which is disposed on and rotatable with the second pivot shaft 471. In this embodiment, the second gear 472 is a spiral bevel gear.

The synchronously driving unit 48 is coupled with the first and second coupling units 46, 47. The synchronously driving unit 48 includes a transmitting gear 481 which meshes with the first and second gears 462, 472, and a gear frame 483 which is disposed on the base seat 21 and which is sleeved on the first and second pivot shafts 461, 471 and permits rotation of the first and second pivot shafts 461, 471 relative thereto. The gear frame 483 has two lugs 484 which are disposed between the first and second pivot shafts 461, 471 and which are spaced apart from each other in the up-and-down direction (D2), and a spindle 482 which extends in the up-and-down direction (D2) and which interconnects the lugs 484. The transmitting gear 481 is journalled on the spindle 482 to be interposed between and mesh with the first and second gears 462, 472 so as to transmit the rotation of the first coupling unit 46 to the second coupling unit 47 to rotate the second coupling unit 47 in an opposite rotational direction relative to that of the first coupling unit 46 for making synchronous pivoting of the first and second movable arms 411, 431 in opposite rotational directions, and vice versa.

Referring to FIG. 4, the first friction increasing structure 491 is disposed on the base seat 21 and is sleeved on and in frictional engagement with the first pivot shaft 461 so as to angularly position the first arm unit 41. The second friction increasing structure 492 is disposed on the base seat 21, and is sleeved on and in frictional engagement with the second pivot shaft 471 so as to angularly position the second arm unit 43. In this embodiment, the first and second friction increasing structures 491, 492 are integrally formed with each other as a positioning unit 49. The included angle between the first and second arm units 41, 43 may range from 0 to 180 degrees.

Referring to FIGS. 12 and 14 to 16, when a user operates the flexible electronic device from the unfolded state (see FIGS. 1 and 12) to the folded state (see FIG. 2), for example, folds the first casing 22 to the second casing 23, through the first support substrate 312 and the first elongated seat 311, the first arm unit 41 connected with the first elongated seat 311 is pivoted toward the second arm unit 43. During the pivoting of the first arm unit 41, as shown in FIGS. 9 to 11, each of the first and second cam follower protrusions 4161, 4361 is moved from the respective retaining cavity 4533, 4543 and upwardly slides on the respective peripheral cam surface section 4532, 4542 to move each of the first and second movable arms 411, 431 away from the cam 45 and to bring each of the first and second substrate units 31, 33 distant from the respective one of the first and second mounting plates 32, 34 by a distance (d) (see FIGS. 14 and 15) so as to provide a leeway 5 between the first and second substrate units 31, 33 for the flexible display 1 to be bendably received therein. For example, the dimension of the leeway 5 is determined in accordance with the dimension of the flexible display 1.

During the pivoting of the first arm unit 41 toward or away from the second arm unit 43, as shown in FIGS. 8, 10 and 16, the first spring 413 is tensed so as to bias the first movable arm 411 toward the first stationary arm 412 to keep the first movable arm 411 in slidable engagement with the corresponding peripheral cam surface section 4532. Meanwhile, with the transmission of the synchronously driving unit 48 and the first and second coupling units 46, 47 resulting in a synchronous pivoting of the second arm unit 43, the second spring 433 is tensed so as to bias the second movable arm 431 toward the second stationary arm 432 to keep the second movable arm 431 in slidable engagement with the corresponding peripheral cam surface section 4542.

During the pivoting of the second movable arm 431 toward the first movable arm 411, as shown in FIGS. 9 to 11, the second cam follower protrusion 4361 is moved from the corresponding retaining cavity 4543 and upwardly slides on the corresponding peripheral cam surface section 4542 to move the second movable arm 431 away from the cam 45 and to bring the second substrate unit 33 distant from the second mounting plate 34 by the distance (d) (see FIG. 14) so as to provide the leeway 5 between the first and second substrate units 31, 33 for the flexible display 1 to be bendably received therein. Moreover, in the folded state, two ends of the flexible display 1 are tensed upwardly by the first and second support substrates 312, 332 to reduce the bending range of the bending portion of the flexible display 1 so as to prevent overbending of the same.

Figure 12:
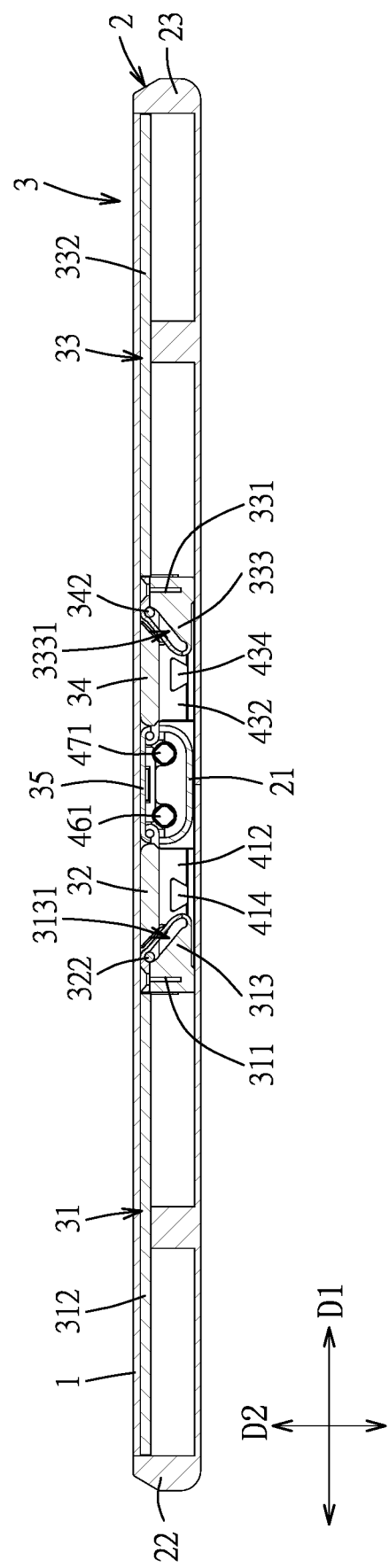
FIG. 12 is a sectional view taken along line XII-XII of FIG. 6.

When the first casing 22 is unfolded from the second casing 23, through the first support substrate 312 and the first elongated seat 311, the first arm unit 41 is pivoted away from the second arm unit 43. During the pivoting of the first arm unit 41, as shown in FIGS. 11 to 9, each of the first and second cam follower protrusions 4161, 4361 downwardly slides on and along the respective peripheral cam surface section 4532, 4542 and is moved in the respective retaining cavity 4533, 4543 to move each of the first and second movable arms 411, 431 toward the cam 45 and to bring each of the first and second elongated seats 311, 331 to be abutted against the respective one of the first and second mounting plates 32, 34 (as shown in FIG. 12).

As illustrated, with the first and second movable arms 411, 431 of the hinge mechanism 4 synchronously pivoting in opposite rotational directions, the first and second substrate units 31, 33 can be respectively moved away from the first and second mounting plates 32, 34 such that the first mounting plate 32, the second mounting plate 34 and the base plate 35 are lowered to provide thereamong the leeway 5 for receiving the bending portion of the flexible display 1 without the need to increase the size of the flexible electronic device. Moreover, the hinge mechanisms 4 are not directly disposed on the flexible display 1 so as to allow for a greater degree of freedom in the design of the hinge mechanisms 4 without need to consider bending of the flexible display 1 but with the reduction of the manufacturing cost achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge mechanism comprising:
a cam extending in a left-and-right direction to have left and right sides, and a middle portion interposed between said left and right sides, said cam having two adjusting slots which are formed in said middle portion and spaced apart from each other in the left-and-right direction, two arcuate surface sections which are respectively disposed on said left and right sides and face upwardly, and two peripheral cam surface sections which are respectively disposed on said left and right sides and respectively face said arcuate surface sections to cooperatively define two retaining cavities;
a first arm unit including a first movable arm which has first proximate and distal ends relative to said left side of said cam, a first cam follower protrusion that is disposed on said first proximate end and movably received in one of said retaining cavities, and a first peg that extends in a front-and-rear direction transverse to the left-and-right direction and that is engaged in and movable relative to one of said adjusting slots; and
a second arm unit including a second movable arm which has second proximate and distal ends relative to said right side of said cam, a second cam follower protrusion that is disposed on said second proximate end and movably received in the other one of said retaining cavities, and a second peg that extends in the front-and-rear direction and that is engaged in and movable relative to the other one of said adjusting slots such that said first and second movable arms are pivotable relative to each other between an unfolded position, where said first and second distal ends are remote from each other to have said first and second movable arms extending parallel to each other along the left-and-right direction and where said first and second cam follower protrusions are respectively received in said retaining cavities, and a folded position, where said first and second distal ends are close to each other and have said first and second movable arms extending in an up-and-down direction that is transverse to both the left-and-right direction and the front-and-rear direction, and where said first and second cam follower protrusions are respectively disengaged from and disposed upwardly of said retaining cavities, and such that during the pivoting of said first and second movable arms from the unfolded position to the folded position, each of said first and second cam follower protrusions is moved from said respective cavity and slides on a respective one of said peripheral cam surface sections so as to provide a leeway between said first and second movable arms.

2. The hinge mechanism as claimed in claim 1, wherein each of said adjusting slots is elongated in the up-and-down direction to allow movable engagement of a respective one of said first and second pegs therein with the pivoting of said first and second movable arms.

3. The hinge mechanism as claimed in claim 2, said hinge mechanism being adapted to be mounted on a support structure which includes first and second substrate units juxtaposed and spaced apart from each other in the left-and-right direction, wherein said hinge mechanism further comprises first and second coupling units which are disposed adjacent to said cam and which are driven to rotate with said first and second arm units, respectively;
said first arm unit including a first stationary arm which is connected to and permits movement of said first movable arm relative thereto, and which has a cam-side end that is connected to said first coupling unit to rotate said first coupling unit during the pivoting of said first movable arm, and a spring-side end opposite to said cam-side end, and a first spring which is connected to said spring-side end and said first distal end to bias said first movable arm toward said first stationary arm during the pivoting of said first movable arm so as to keep said first movable arm in slidable engagement with said corresponding peripheral cam surface section;

said second arm unit including a second stationary arm which is connected to and permits movement of said second movable arm relative thereto, and which has a cam-side end that is connected to said second coupling unit to rotate said second coupling unit during the pivoting of said second movable arm, and a spring-side end opposite to said cam-side end, and a second spring which is connected to said spring-side end and said second distal end to bias said second movable arm toward said second stationary arm during the pivoting of said second movable arm so as to keep said second movable arm in slidable engagement with said corresponding peripheral cam surface section.

4. The hinge mechanism as claimed in claim 3, wherein said first arm unit includes at least one first spacer which is disposed on said first stationary arm and which extends to abut against said first movable arm when said first movable arm is moved relative to said first stationary arm, said second arm unit including at least one second spacer which is disposed on said second stationary arm and which extends to abut against said second movable arm when said second movable arm is moved relative to said second stationary arm.

5. The hinge mechanism as claimed in claim 3, wherein each of said first and second movable arms has a sliding slot elongated to terminate at two opposite closed ends, each of said first and second stationary arms having a sliding peg which is extended into and slidable along said sliding slot so as to guide the movement of said first and second movable arms relative to said first and second stationary arms and so as to limit the distance of the movement by said closed ends.

6. The hinge mechanism as claimed in claim 3, further comprising:
abase seat on which said first and second coupling units are pivotably mounted; and
a synchronously driving unit which is coupled with said first and second coupling units and which transmits the rotation of said first coupling unit to said second coupling unit to rotate said second coupling unit in an opposite rotational direction relative to that of said first coupling unit so as to make synchronous pivoting of said first and second movable arms in opposite rotational directions.

7. The hinge mechanism as claimed in claim 6, wherein said first coupling unit includes a first pivot shaft which is pivotably connected to said base seat about a first pivot axis in the front-and-rear direction and which is engaged with said cam-side end of said first stationary arm, and a first gear which is disposed on and rotatable with said first pivot shaft, said second coupling unit including a second pivot shaft which is pivotably connected to said base seat about a second pivot axis in the front-and-rear direction and which is engaged with said cam-side end of said second stationary arm, and a second gear which is disposed on and rotatable with said second pivot shaft, said synchronously driving unit including a transmitting gear which meshes with said first and second gears.

8. The hinge mechanism as claimed in claim 7, wherein said synchronously driving unit includes a gear frame which is disposed on said base seat and which is sleeved on said first and second pivot shafts and permits rotation of said first and second pivot shafts relative thereto, said gear frame having two lugs which are disposed between said first and second pivot shafts and which are spaced apart from each other in the up-and-down direction, and a spindle which extends in the up-and-down direction and which interconnects said lugs, said transmitting gear being journalled on said spindle to be interposed between and mesh with said first and second gears.

9. The hinge mechanism as claimed in claim 8, further comprising a first friction increasing structure which is disposed on said base seat and which is sleeved on and in frictional engagement with said first pivot shaft so as to angularly position said first arm unit, and a second friction increasing structure which is disposed on said base seat and which is sleeved on and in frictional engagement with said second pivot shaft so as to angularly position said second arm unit.

10. A flexible electronic device comprising:
a flexible display;
a support structure including first and second substrate units which are juxtaposed and spaced apart from each other in a left-and-right direction, a first mounting plate which is movably connected with said first substrate unit and interposed between said first and second substrate units, and a second mounting plate which is movably connected with said second substrate unit and interposed between said first mounting plate and said second substrate unit, said first and second substrate units and said first and second mounting plates being coplanar to cooperatively define a display supporting surface for said flexible display to be attached thereto; and
two hinge mechanisms disposed between said first and second substrate units and opposite to each other in a front-and-rear direction transverse to the left-and-right direction, each of said hinge mechanisms including:
a cam extending in the left-and-right direction to have left and right sides, and a middle portion interposed between said left and right sides, said cam having two adjusting slots which are formed in said middle portion and spaced apart from each other in the left-and-right direction, two arcuate surface sections which are respectively disposed on said left and right sides and face upwardly, and two peripheral cam surface sections which are respectively disposed on said left and right sides and respectively face said arcuate surface sections to cooperatively define two retaining cavities;
a first arm unit including a first movable arm which has first proximate and distal ends relative to said left side of said cam, a first cam follower protrusion that is disposed on said first proximate end and movably received in one of said retaining cavities, and a first peg that extends in the front-and-rear direction and that is engaged in and movable relative to one of said adjusting slots; and
a second arm unit including a second movable arm which has second proximate and distal ends relative to said right side of said cam, a second cam follower protrusion that is disposed on said second proximate end and movably received in the other one of said retaining cavities, and a second peg that extends in the front-and-rear direction and that is engaged in and movable relative to the other one of said adjusting slots such that said first and second movable arms are pivotable relative to each other between an unfolded position, where said first and second distal ends are remote from each other to have said first and second movable arms extending parallel to each other along the left-and-right direction and where said first and second cam follower protrusions are respectively received in said retaining cavities, and a folded position, where said first and second distal ends are close to each other and have said first and second movable arms extending in an up-and-down direction that is transverse to both the left-and-right direction and the front-and-rear direction, and where said first and second cam follower protrusions are respectively disengaged from and disposed upwardly of said retaining cavities, and such that during the pivoting of said first and second movable arms from the unfolded position to the folded position, each of said first and second cam follower protrusions is moved from said respective cavity and slides on a respective one of said peripheral cam surface sections to move each of said first and second movable arms away from said cam and to bring each of said first and second substrate units distant from a respective one of said first and second mounting plates by a distance so as to provide a leeway between said first and second substrate units for said flexible display to be bendably received therein.

11. The flexible electronic device as claimed in claim 10, wherein said support structure includes a base plate interposed between and pivotably connected with said first and second mounting plates, said first substrate unit having a first elongated seat which extends in the front-and-rear direction to terminate at front and rear end portions for said first movable arms of said hinge mechanisms to be securely engaged therewith, and a plurality of first connecting blocks which are disposed between said front and rear end portions of said first elongated seat and each of which has a first inclined slot that is inclined relative to said base plate, said first mounting plate having, relative to said base plate, a remote side which is movably engaged with said first inclined slots to allow the movement of said first substrate unit relative to said first mounting plate, said second substrate unit having a second elongated seat which extends in the front-and-rear direction to terminate at front and rear end portions for said second movable arms of said hinge mechanisms to be securely engaged therewith, and a plurality of second connecting blocks which are disposed between said front and rear end portions of said second elongated seat and each of which has a second inclined slot that is inclined relative to said base plate, said second mounting plate having, relative to said base plate, a remote side which is movably engaged with said second inclined slots to allow the movement of said second substrate unit relative to said second mounting plate.

* * * * *